United States Patent
Yamazaki et al.

(10) Patent No.: US 8,433,465 B2
(45) Date of Patent: Apr. 30, 2013

(54) TRANSITIONING BETWEEN SERIES-DRIVE AND PARALLEL-DRIVE IN A HYBRID-ELECTRIC VEHICLE POWERTRAIN

(75) Inventors: Mark S. Yamazaki, Canton, MI (US); Fazal U. Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 490 days.

(21) Appl. No.: 12/795,806

(22) Filed: Jun. 8, 2010

(65) Prior Publication Data

US 2011/0301792 A1    Dec. 8, 2011

(51) Int. Cl.
*B60L 9/00*    (2006.01)

(52) U.S. Cl.
USPC .......................................................... 701/22

(58) Field of Classification Search .................... 701/22, 701/93
See application file for complete search history.

(56) References Cited

U.S. PATENT DOCUMENTS

| | | | |
|---|---|---|---|
| 7,356,391 B2* | 4/2008 | Matsuda et al. | 701/22 |
| 2004/0134697 A1* | 7/2004 | Kobayashi et al. | 180/65.2 |
| 2004/0154853 A1* | 8/2004 | Aikawa et al. | 180/242 |
| 2006/0048982 A1* | 3/2006 | Yamamoto et al. | 180/65.2 |
| 2009/0211826 A1* | 8/2009 | Hashimoto | 180/65.275 |
| 2010/0087288 A1* | 4/2010 | Yamamoto | 477/3 |
| 2011/0192666 A1* | 8/2011 | Schmid et al. | 180/165 |

* cited by examiner

*Primary Examiner* — Hussein A. Elchanti
(74) *Attorney, Agent, or Firm* — David B. Kelley; MacMillan, Sobanski & Todd, LLC

(57) ABSTRACT

A method for operating a powertrain includes determining maximum and minimum series-drive power limits of powertrain electric components; operating in parallel-drive if vehicle speed exceeds a reference, demanded wheel power is between said limits, or demanded engine power exceeds a reference demanded engine power; and operating in series-drive if vehicle speed is less than a reference, demanded wheel power is between said limits, and demanded engine power is less than a reference engine power.

19 Claims, 5 Drawing Sheets

TRANSITIONING BETWEEN SERIES-DRIVE AND PARALLEL-DRIVE IN A HYBRID-ELECTRIC VEHICLE POWERTRAIN

BACKGROUND OF THE INVENTION

1. Field of the Invention

This invention relates generally to a powertrain for a hybrid electric vehicle (HEV). More particularly, it pertains to the control of transitions between series drive and parallel drive operation of the powertrain.

2. Description of the Prior Art

The powertrain for hybrid electric vehicle may include two electric machines in combination with an engine and transmission to operate in at least two operating modes, series and parallel drive, sometimes called a dual-drive hybrid-electric powertrain configuration. The first electric machine is mechanically coupled between the engine and transmission on the front axle in order to provide starter/generator capability. The second electric machine is connected to the rear axle in order to provide additional propulsion capability in either an electric or hybrid drive mode, resulting in two independently driven axles. The electric machines are powered by a high-voltage battery using inverters.

This powertrain configuration provides great flexibility for operating the powertrain in various modes, such as electric mode, series mode, and parallel or split mode to satisfy the driver's demand and achieve better fuel efficiency without compromising other vehicle performance attributes.

Given the architectural complexity and the operational flexibility of this powertrain, it is essential to have a highly coordinated vehicle control system to perform the blending of torque, speed, and power from multiple power sources in addition to managing transmission, engine and electric machine subsystem control.

A need exists in the industry for a control method that produces transition between series drive mode and parallel or split drive mode that takes into account various sources of information about the driveline and state of the electrical drive components.

SUMMARY OF THE INVENTION

A method for operating a powertrain includes determining maximum and minimum series-drive power limits of powertrain electric components; operating in parallel-drive if vehicle speed exceeds a reference, demanded wheel power is between said limits, or demanded engine power exceeds a reference demanded engine power; and operating in series-drive if vehicle speed is less than a reference, demanded wheel power is between said limits, and demanded engine power is less than a reference engine power.

The control method employs a calculation based on vehicle speed, engine power demand, and driver demanded wheel power. Dynamic signals for maximum power and minimum power levels of the electrical components of the driveline are calculated dynamically and are used to determine whether the vehicle should be operating in a series drive mode or a parallel drive mode.

The control method calculates the maximum and minimum power of the electric drive components dynamically, and bases the decision of whether to operate the vehicle in series mode or parallel mode upon these calculations.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
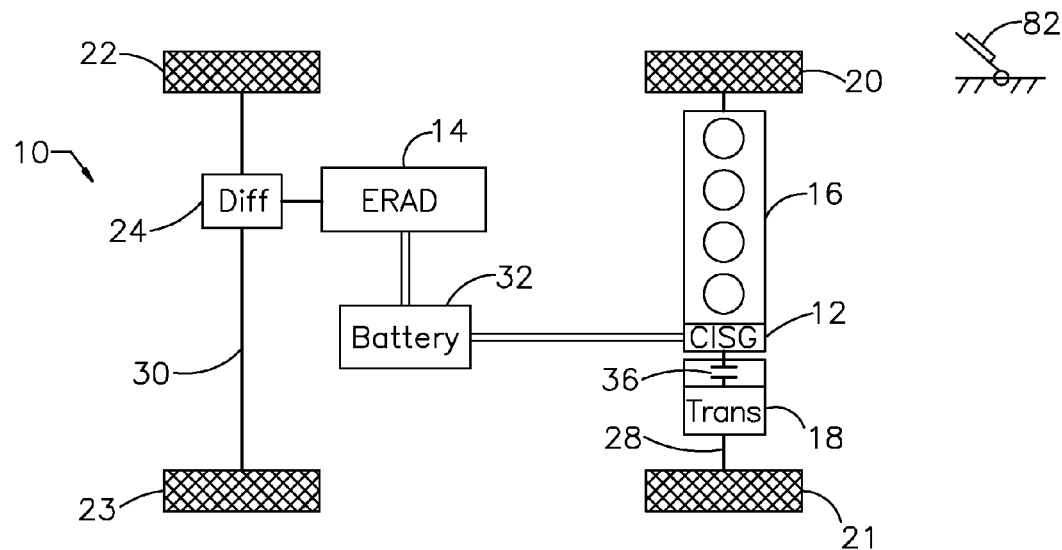
FIG. 1 is a schematic diagram showing components of a dual-drive hybrid-electric powertrain.

Referring now to FIG. 1, a dual-drive hybrid-electric powertrain 10 operates alternately in series drive and parallel drive. The powertrain 10 includes two electric machines 12, 14; an internal combustion engine 16, such as a diesel engine, a multiple-speed transmission 18 that can produce a range of torque ratios, such as a wet-clutch powershift transmission; a first set of wheels 20, 21; a second set of wheels 22, 23; and a differential mechanism 24. A clutch 36 alternately connects and disconnects the engine crankshaft and the transmission input shaft.

The first electric machine 12, called Crankshaft Integrated Starter Generator (CISG), is mechanically coupled between the engine 16 and transmission 18 on the first (front) axle 28 in order to provide starter/generator capability. The second electric machine 14, called the Electric Rear Axle Drive (ERAD), is connected to the second (rear) axle 30 in order to provide additional propulsion capability in either an electric or hybrid drive mode, resulting in two independently driven axles. The CISG 12 and ERAD 14 are powered by a high-voltage (HV) battery 32 using inverters.

Although this description refers to the electric machine being an ERAD 14, implying that front axle 28 and front wheels 20, 21 are driven by the engine 16 and transmission 18, the electric machine could instead be an Electric Front Axle Drive (EFAD) 14, in which case the front axle 30 and the front wheels 22, 23 are driven by the EFAD 14 and the rear axle 28 and rear wheels 20, 21 are driven by the engine 16 and transmission 18.

This powertrain 10 configuration provides great flexibility for operating the powertrain in various modes, such as electric mode, series mode, and parallel or split mode to satisfy the driver's demand and achieve better fuel efficiency without compromising other vehicle performance attributes. Given the architectural complexity and the operational flexibility of the powertrain, it is essential to have a highly coordinated vehicle control system to perform the blending of torque, speed, and power from multiple power sources in addition to managing transmission, engine and electric machine subsystem control. The decision of whether to operate the powertrain 10 in series mode or parallel (split) mode requires a calculation that takes into account various sources of information about the driveline and state of the electrical drive components.

In order to coordinate the actions of the subsystems (engine 16, transmission 18, CISG 12 and ERAD 14), a Vehicle System Controller (VSC) contains a function called Powertrain Operating Mode (PTOM) control. PTOM control coordinates operation of the CISG-ERAD subsystems in order to request electric drive, series drive, parallel drive, engine start, and engine stop. A control algorithm accessible to the PTOM control decides whether to request speed control or torque control from the subsystems based upon various vehicle inputs.

Figure 2:
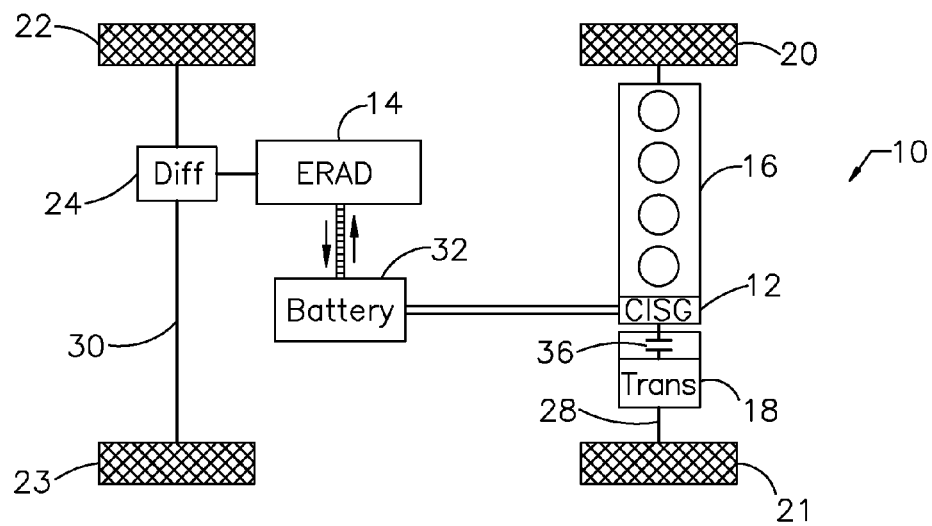
FIG. 2 is schematic diagram showing the electric drive mode of operation of the powertrain of FIG. 1.

The CISG-ERAD powertrain 10 enables the vehicle to operate in one of three main operational modes. The first mode of operation, shown in FIG. 2, is electric-drive, wherein the battery 32 supplies power to the ERAD 14 in order to propel the vehicle by delivering torque to the wheels 22, 23. Clutch 36 is open when the electric drive mode is operative.

Figure 3:
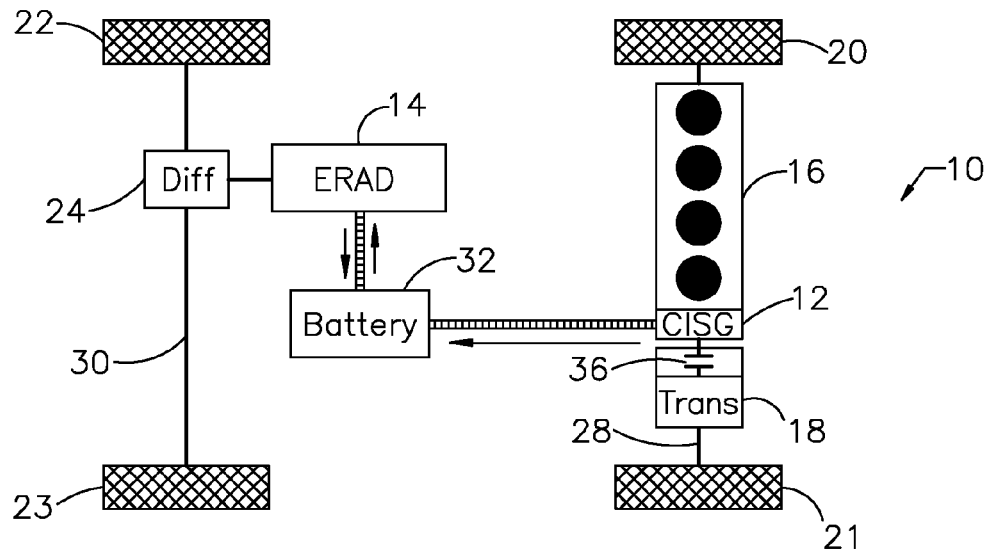
FIG. 3 is schematic diagram showing the series drive mode of operation of the powertrain of FIG. 1.

The second mode of operation, shown in FIG. 3, is series-drive, wherein the engine 16 drives the CISG 12 in order to charge the battery 32, which is supplying power to the ERAD 14 to propel the vehicle by delivering torque to the wheels 22, 23. Clutch 36 is open when the series drive mode is operative.

Figure 4:
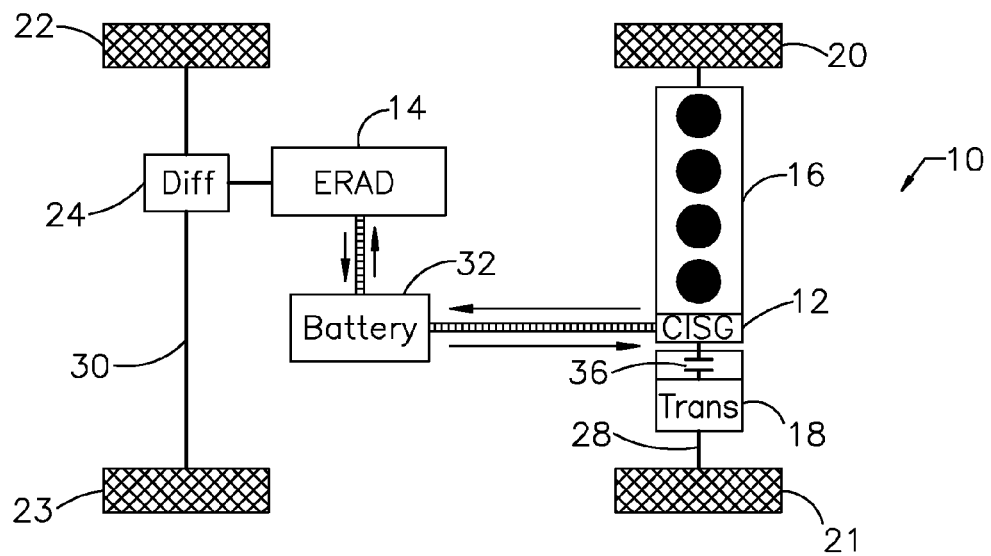
FIG. 4 is schematic diagram showing the parallel or split drive mode of operation of the powertrain of FIG. 1.

The third mode of operation, shown in FIG. 4, is split or parallel-drive, wherein the engine 16 and transmission 18 provide torque to the wheels 20, 21 while the battery 32 and ERAD 14 provide torque to the wheels 22, 23 in order to propel the vehicle. Clutch 36 is closed when the parallel or split drive mode is operative. These primary modes, as well as supplementary and transitional modes are arbitrated and coordinated by the PTOM control algorithm.

Figure 5:
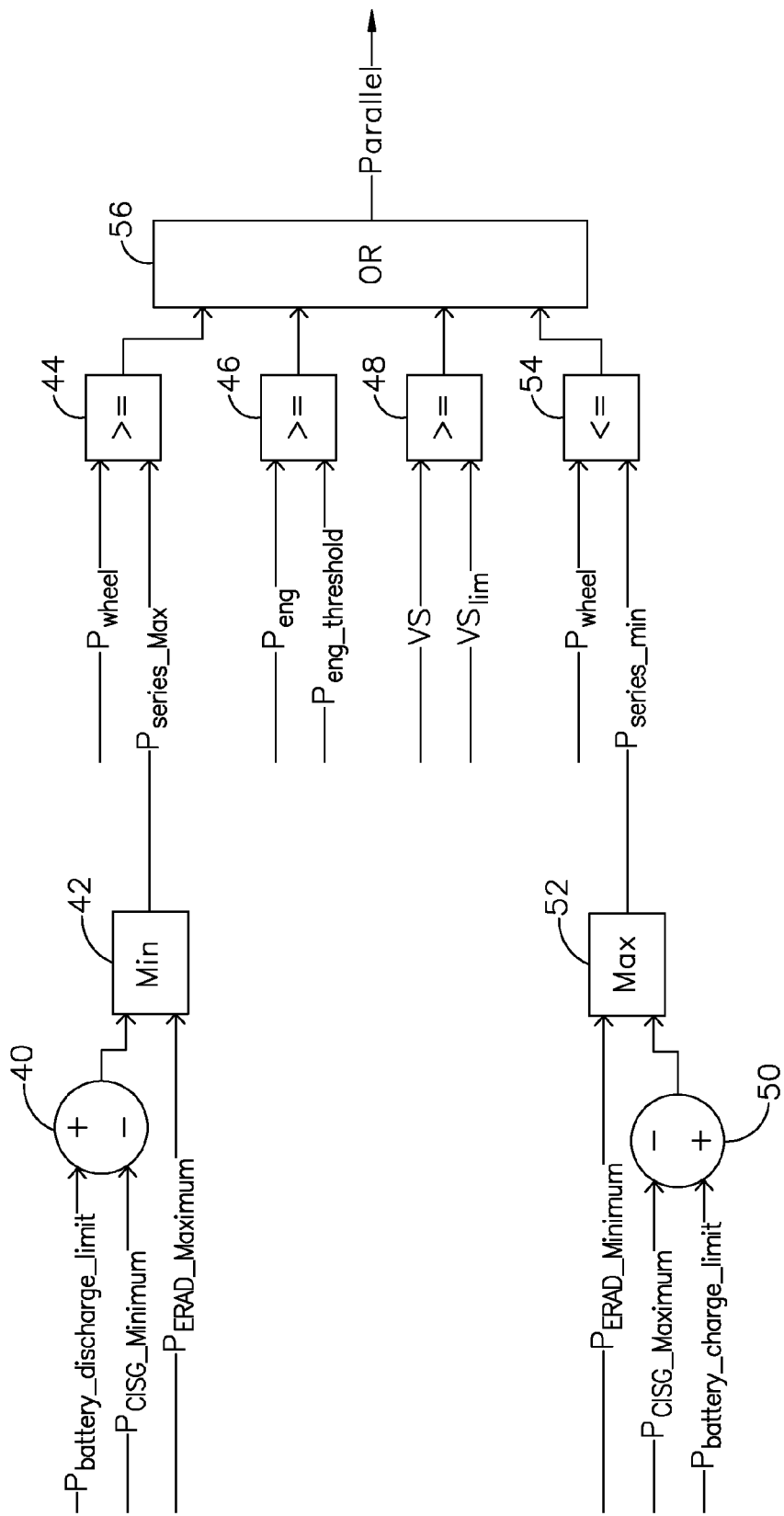
FIG. 5 is a diagram that shows the steps of a PTOM algorithm that causes the powertrain to transition from series drive to parallel drive.
Figure 6:
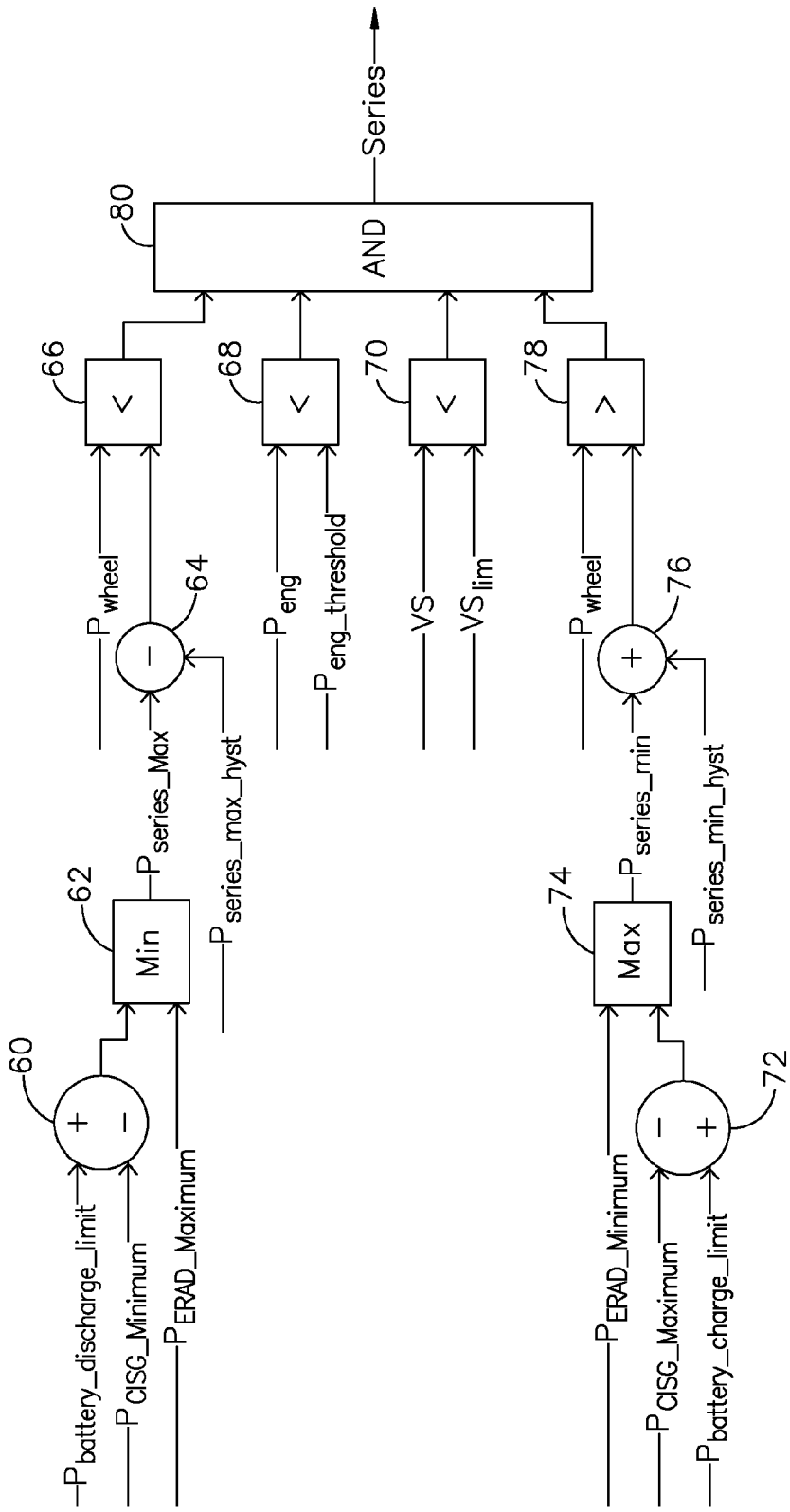
FIG. 6 is a diagram that shows the steps of a PTOM algorithm that cause the powertrain to transition from parallel drive to series drive.

The conditions that cause transitions between series mode and parallel mode are expressed in equations (1) and (2) and are illustrated in FIGS. 5 and 6.

The PTOM control issues control signals, to which the components of the powertrain 10 respond, causing a transition from series drive to parallel drive if:

$$\text{Parallel} = \{(VS \geq VS_{lim}) \text{ OR } (P_{wheel} \geq P_{series\_max}) \text{ OR } (P_{wheel} \leq P_{series\_min}) \text{ OR } (P_{eng} \geq P_{eng\_threshold})\} \quad (1)$$

wherein:
VS is vehicle speed;
$VS_{lim}$ is vehicle speed limit for series drive;
$P_{wheel}$ is driver demanded wheel power;
$P_{series\_max}$ is $\text{Min}[(P_{battery\ discharge\ limit} - P_{CISG\ minimum}), P_{ERAD\ maximum}]$;
$P_{battery\ discharge\ limit}$ is maximum discharge power limit of battery;
$P_{CISG\ minimum}$ is CISG minimum power limit, which is a negative number when the CISG 12 is charging the battery 32;
$P_{ERAD\ maximum}$ is ERAD maximum power limit;
$P_{series\_min}$ is $\text{Max}[(P_{battery\ charge\ limit} - P_{CISG\ maximum}), P_{ERAD\ minimum}]$;
$P_{CISG\ maximum}$ is CISG maximum power limit, which is a negative number when the CISG 12 is charging the battery 32;
$P_{ERAD\ minimum}$ is ERAD minimum power limit;
$P_{eng}$ is power demanded from the engine; and
$P_{eng\_threshold}$ is engine power threshold for series driving.

The PTOM control algorithm whose execution indicates need to transition the powertrain 10 from series drive to parallel drive is explained with reference to FIG. 5.

At step 40 ($P_{battery\ battery\ discharge\ limit} - P_{CISG\ minimum}$) is calculated.

At step 42 $P_{series\_max}$ is calculated from $\text{Min}[(P_{battery\ discharge\ limit} - P_{CISG\ minimum}), P_{ERAD\ maximum}]$.

At step 44 a test is made to determine whether ($P_{wheel} \geq P_{series\_max}$) is true.

At step 46 a test is made to determine whether ($P_{eng} \geq P_{eng\_threshold}$) is true.

At step 48 a test is made to determine whether ($VS \geq VS_{lim}$) is true.

At step 50 ($P_{battery\ battery\ charge\ limit} - P_{CISG\ maximum}$) is calculated.

At step 52 $P_{series\_min}$ is calculated from $\text{Max}[(P_{battery\ charge\ limit} - P_{CISG\ maximum}), P_{ERAD\ minimum}]$.

At step 54 a test is made to determine whether ($P_{wheel} \geq P_{series\_max}$) is true.

At step 56 a test is made of the results produced at steps 44, 46, 48 and 54 to determine whether equation (1) is satisfied. If the test at step 56 is logically true, the powertrain 10 transitions to parallel drive operation, as described with reference to FIG. 4.

The PTOM control issues control signals, to which the components of the powertrain 10 respond, causing a transition from parallel drive to series drive if:

$$\text{Series} = \{(VS < VS_{lim}) \text{ AND } (P_{wheel} < (P_{series\_max} - P_{series\_max\_hyst})) \text{ AND } (P_{wheel} > (P_{series\_min} + P_{series\_min\_hyst})) \text{ AND } (P_{eng} < P_{eng\_threshold})\} \quad (2)$$

wherein:
VS is vehicle speed;
$VS_{lim}$ is vehicle speed limit for series drive;
$P_{wheel}$ is driver demanded wheel power;
$P_{series\_max}$ is $\text{Min}[(P_{battery\ discharge\ limit} - P_{CISG\ minimum}), P_{ERAD\ maximum}]$;
$P_{battery\ discharge\ limit}$ is maximum discharge power limit of battery;
$P_{CISG\ minimum}$ is CISG minimum power limit, which is a negative number when the CISG 12 is charging the battery 32;
$P_{ERAD\ maximum}$ is ERAD maximum power limit;
$P_{series\_max\_hyst}$ is hysteresis value for maximum driver demanded power in series drive;
$P_{series\_min}$ is $\text{Max}[(P_{battery\ charge\ limit} - P_{CISG\ maximum}), P_{ERAD\ minimum}]$;
$P_{battery\ charge\ limit}$ is maximum charge power limit of battery;
$P_{CISG\ maximum}$ is CISG maximum power limit, which is a negative number when the CISG 12 is charging the battery 32;
$P_{ERAD\ minimum}$ is ERAD minimum power limit;
$P_{series\_min\_hyst}$ is hysteresis value for minimum driver demanded power in series drive;
$P_{eng}$ is power demanded from the engine; and
$P_{eng\_threshold}$ is engine power threshold for series driving.

The PTOM control algorithm whose execution indicates need to transition the powertrain 10 from series drive to parallel drive is explained with reference to FIG. 6.

At step 60 ($P_{battery\ battery\ discharge\ limit} - P_{CISG\ minimum}$) is calculated.

At step 62 $P_{series\_max}$ is calculated from $\text{Min}[(P_{battery\ discharge\ limit} - P_{CISG\ minimum}), P_{ERAD\ maximum}]$.

At step 64 ($P_{series\_max} - P_{series\_max\_hyst}$) is calculated.

At step 66, a test is made to determine whether ($P_{wheel} < (P_{series\_max} - P_{series\_max\_hyst})$) is true.

At step 68 a test is made to determine whether $(P_{eng} < P_{eng\_threshold})$ is true.

At step 70 a test is made to determine whether $(VS < VS_{lim})$ is true.

At step 72 $(P_{battery\ battery\ charge\ limit} - P_{CISG\ maximum})$ is calculated.

At step 74 $P_{series\_min}$ is calculated from Max $[(P_{battery\ charge\ limit} - P_{CISG\ maximum}), P_{ERAD\ minimum}]$.

At step 76 $(P_{series\_min} + P_{series\_min\_hyst})$ is calculated.

At step 78 a test is made to determine whether $(P_{wheel} > (P_{series\_min} + P_{series\_min\_hyst})$ is true.

At step 80 a test is made of the results produced at steps 66, 68, 70 30 and 78 to determine whether equation (2) is satisfied. If the test at step 80 is logically true, powertrain 10 transitions to series drive operation, as described with reference to FIG. 3.

Figure 7:
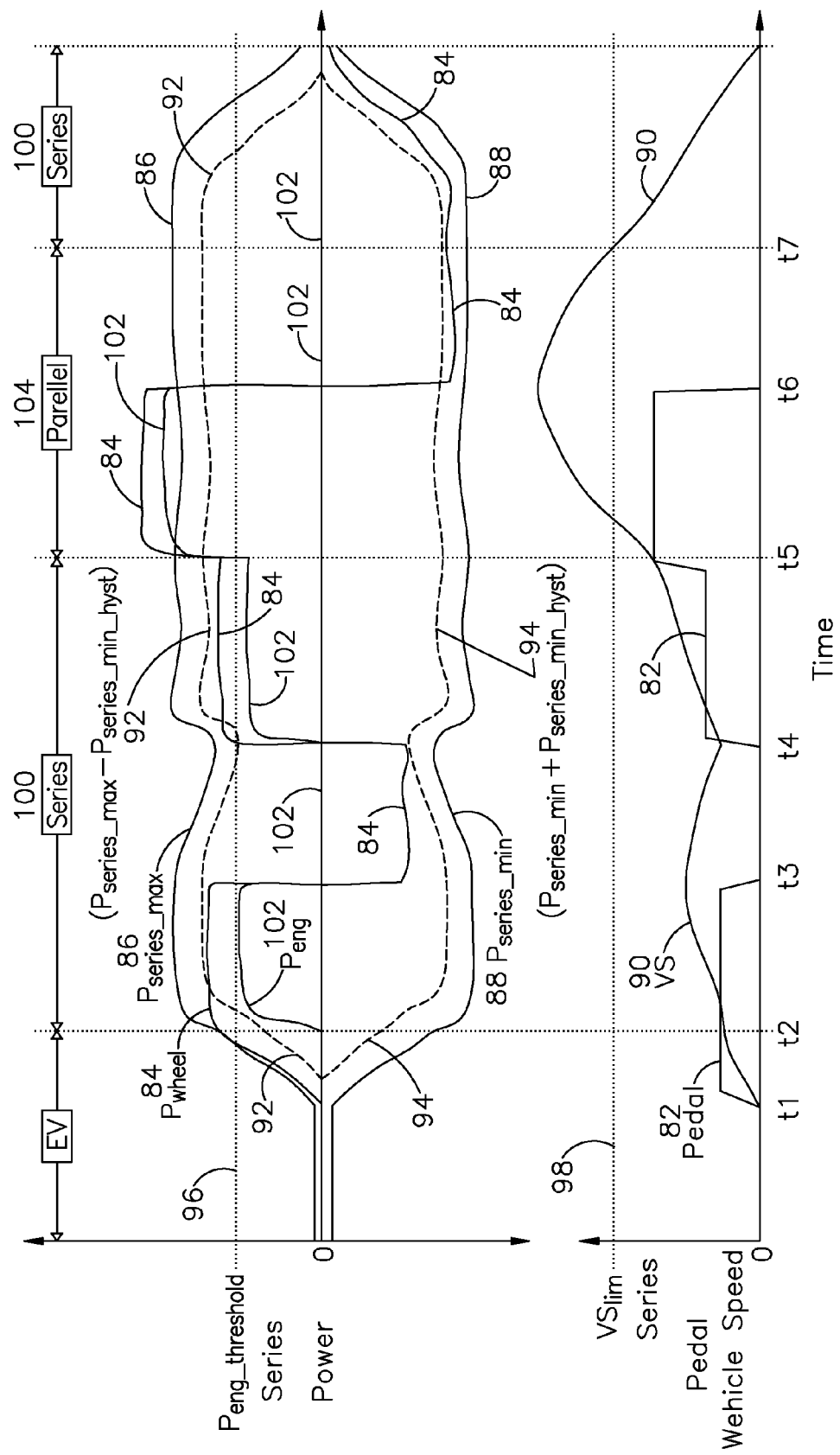
FIG. 7 is a signal diagram showing the variation over time of certain powertrain variable while transitions between series drive and parallel drive occur.

FIG. 7 is a signal diagram showing the variation over time of certain powertrain parameters while transitions between series drive mode and parallel drive mode occur. FIG. 7 shows the transitions from series mode to parallel mode due to the conditions in Equations 1 and 2.

At time t1, the vehicle operator or driver steps into the accelerator pedal 82, and the driver demanded wheel power 84 $P_{wheel}$ increases. $P_{series\_max}$ driver demanded wheel power 84 and $P_{series\_min}$ 88 increase as vehicle speed 90 increases. $P_{eng\_threshold}$ 96, the engine power threshold for series driving, and the vehicle speed limit for series driving 98 $VS_{lim}$, are constant.

At time t2, vehicle conditions are such that the engine 16 is turned on, series drive mode 100 is entered, and power demanded from the engine 102 $P_{eng}$ increases.

At time t3, the driver releases the pedal 82. Driver demanded wheel power 84 $P_{wheel}$ and engine speed 102 $P_{eng}$ decrease. $P_{series\_max}$ 86 decreases and $P_{series\_min}$ 88 increases as vehicle speed 90 decreases.

At time t4, the driver steps back into the pedal.

At time t5, the driver steps further into the pedal 82, which action causes driver demanded wheel power 84 $P_{wheel}$ to increase to a magnitude greater than $P_{series\_max}$ 86, and power demanded from the engine 102 $P_{eng}$ to increase to a magnitude greater than the engine power threshold 96 for series driving $P_{eng\_threshold}$. At time t5, parallel drive mode is entered.

At time t6, the driver steps out of the pedal 82, which action causes driver demanded wheel power 84 $P_{wheel}$ and power demanded from the engine 102 $P_{eng}$ to decrease.

At time t7, the vehicle speed 90 drops below the vehicle speed limit for series driving 98 $VS_{lim}$, and series drive mode 100 is reentered.

In FIG. 7, the difference between $P_{series\_max}$ 86 and $(P_{series\_max} - P_{series\_max\_hyst})$ 92 is represented graphically by a space or gap $P_{series\_max\_hyst}$. The difference between $P_{series\_min}$ 88 and $(P_{series\_min} + P_{series\_min\_hyst})$ 94 is represented graphically by a space or gap $P_{series\_min\_hyst}$. The presence of hysteresis values $P_{series\_max\_hyst}$ and $P_{series\_min\_hyst}$ in equation (1) avoids undesired cycling from series drive to parallel drive and maintains the powertrain 10 in parallel-drive longer, than if the hysteresis values were absent from equation (1).

Although this description refers to the electric machine being an ERAD 14, implying that front axle 28 and front wheels 20, 21 are driven by the engine 16 and transmission 18, the electric machine could instead be an Electric Front Axle Drive (EFAD) 14, in which case the front axle 30 and the front wheels 22, 23 are driven by the EFAD 14 and the rear axle 28 and rear wheels 20, 21 are driven by the engine 16 and transmission 18.

In accordance with the provisions of the patent statutes, the preferred embodiment has been described. However, it should be noted that the alternate embodiments can be practiced otherwise than as specifically illustrated and described.

The invention claimed is:

1. A method for operating a powertrain, comprising:
   (a) determining maximum and minimum series-drive power limits of the powertrain;
   (b) operating the powertrain in parallel-drive if vehicle speed exceeds a reference, demanded wheel power is between said limits, or demanded engine power exceeds a reference engine power;
   (c) operating the powertrain in series-drive if the reference exceeds vehicle speed, demanded wheel power is between said limits, and the reference engine power exceeds demanded engine power.

2. The method of claim 1 wherein vehicle speed is compared in steps (b) and (c) to the same reference vehicle speed.

3. The method of claim 1, wherein operating the powertrain in parallel-drive comprises:
   using an engine and a transmission to drive a first wheel set; and
   using an electric machine powered by a battery to drive a second wheel set.

4. The method of claim 1, further comprising operating the powertrain in parallel-drive if:
   $\{(VS >= VS_{lim})$ OR $(P_{wheel} >= P_{series\_max})$ OR $(P_{wheel} <= P_{series\ min})$ OR $(P_{eng} >= P_{eng\_threshold})\}$
   wherein:
   VS is vehicle speed;
   $VS_{lim}$ is a vehicle speed limit for series drive;
   $P_{wheel}$ is driver demanded wheel power;
   $P_{series\_max}$ is Min $[(P_{battery\ discharge\ limit} - P_{CISG\ minimum}), P_{ERAD\ maximum}]$;
   $P_{battery\ discharge\ limit}$ is maximum discharge power limit of battery;
   $P_{CISG\ minimum}$ is a CISG minimum power limit;
   $P_{ERAD\ maximum}$ is an ERAD maximum power limit;
   $P_{series\_min}$ is Max $[(P_{battery\ charge\ limit} - P_{CISG\ maximum}), P_{ERAD\ minimum}]$;
   $P_{CISG\ maximum}$ is a CISG maximum power limit;
   $P_{ERAD\ minimum}$ is an ERAD minimum power limit;
   $P_{eng}$ is power demanded from the engine; and
   $P_{eng\_threshold}$ is an engine power threshold for series driving.

5. The method of claim 1, further comprising closing a clutch located in a drive path between a transmission and an electric machine that can operate as a generator.

6. The method of claim 1, further comprising charging a battery using an electric machine as a generator driven by an engine.

7. The method of claim 1, wherein operating the powertrain in series-drive further comprises opening a clutch located in a drive path between a transmission and an electric machine operating as a generator.

8. The method of claim 1, wherein operating the powertrain in series-drive comprises:
   charging a battery using a first electric machine as a generator driven by an engine; and
   using a second electric machine powered by the battery to drive vehicle wheels.

9. The method of claim 1, comprising operating the powertrain in series-drive if:
   $\{(VS < VS_{lim})$ AND $(P_{wheel} < (P_{series\_max} - P_{series\_max\_hyst}))$ AND $(P_{wheel}\ (P_{series\_min} + P_{series\_min\_hyst}))$ AND $(P_{eng} < P_{eng\_threshold})\}$ wherein:

VS is vehicle speed;

$VS_{lim}$ is a vehicle speed limit for series drive;

$P_{wheel}$ is driver demanded wheel power;

$P_{series\_max}$ is $Min[(P_{battery\ discharge\ limit} - P_{CISG\ minimum}), P_{ERAD\ maximum}]$;

$P_{battery\ discharge\ limit}$ is a maximum discharge power limit of battery;

$P_{CISG\ minimum}$ is a CISG minimum power limit;

$P_{ERAD\ maximum}$ is an ERAD maximum power limit;

$P_{series\_max\_hyst}$ is a hysteresis value for maximum driver demanded power in series drive;

$P_{series\_min}$ is $Max [(P_{battery\ charge\ limit} - P_{CISG\ maximum}), P_{ERAD\ minimum}]$;

$P_{battery\ charge\ limit}$ is a maximum charge power limit of battery;

$P_{CISG\ maximum}$ is a CISG maximum power limit;

$P_{ERAD\ minimum}$ is an ERAD minimum power limit;

$P_{series\_min\_hyst}$ is a hysteresis value for minimum driver demanded power in series drive;

$P_{eng}$ is power demanded from the engine; and $P_{eng\_threshold}$ is an engine power threshold for series driving.

10. A method for operating a vehicle powertrain, comprising:

using demanded engine power, demanded wheel power and battery power limits, to determine maximum and minimum series-drive power limits of powertrain electric machines and a battery that powers one of the machines;

operating the powertrain in series-drive if vehicle speed is less than a reference, demanded wheel power is between said limits, and demanded engine power is less than a reference engine power; and operating the powertrain in parallel-drive if vehicle speed exceeds a reference, demanded wheel power is between said limits, or demanded engine power exceeds a reference engine power.

11. The method of claim 10, wherein operating the powertrain in parallel-drive comprises:

using an engine and a transmission to drive a first wheel set; and using one of the electric machines powered by a battery to drive a second wheel set.

12. The method of claim 10, comprising operating the powertrain in parallel-drive if:

$\{(VS >= VS_{lim})$ OR $(P_{wheel} >= P_{series\_max})$ OR $(P_{wheel} <= P_{series\_min})$ OR $(P_{eng} >= P_{eng\_threshold})\}$ wherein: VS is vehicle speed;

$VS_{lim}$ is a vehicle speed limit for series drive;

$P_{wheel}$ is driver demanded wheel power;

$P_{series\_max}$ is $Min [(P_{battery\ discharge\ limit} - P_{CISG\ minimum}), P_{ERAD\ maximum}]$;

$P_{battery\ discharge\ limit}$ is maximum discharge power limit of battery;

$P_{CISG\ minimum}$ is a CISG minimum power limit;

$P_{ERAD\ maximum}$ is an ERAD maximum power limit;

$P_{series\_min}$ is $Max [(P_{battery\ charge\ limit} - P_{CISG\ maximum}), P_{ERAD\ minimum}]$;

$P_{CISG\ maximum}$ is a CISG maximum power limit;

$P_{ERAD\ minimum}$ is an ERAD minimum power limit;

$P_{eng}$ is power demanded from the engine; and $P_{eng\_threshold}$ is an engine power threshold for series driving.

13. The method of claim 10, further comprising closing a clutch located in a drive path between a transmission and one of the electric machines.

14. The method of claim 10, further comprising charging the battery using one of the electric machines as a generator driven by an engine.

15. The method of claim 10, wherein operating the powertrain in series-drive further comprises opening a clutch located in a drive path between a transmission and one of the electric machines.

16. The method of claim 10, wherein operating the powertrain in series-drive comprises:

charging a battery using one of the electric machines as a generator driven by an engine; and using another electric machine powered by the battery to drive vehicle wheels.

17. The method of claim 10, comprising operating the powertrain in series-drive if:

$\{(VS < VS_{lim})$ AND $(P_{wheel} < (P_{series\_max} - P_{series\_max\_hyst}))$ AND $(P_{wheel} > (P_{series\_min} + P_{series\_min\_hyst}))$ AND $(P_{eng} < P_{eng\_threshold})\}$ wherein: VS is vehicle speed;

$VS_{lim}$ is a vehicle speed limit for series drive;

$P_{wheel}$ is driver demanded wheel power;

$P_{series\_max}$ is $Min[(P_{battery\ discharge\ limit} - P_{CISG\ minimum}), P_{ERAD\ maximum}]$;

$P_{battery\ discharge\ limit}$ is a maximum discharge power limit of battery;

$P_{CISG\ minimum}$ is a CISG minimum power limit;

$P_{ERAD\ maximum}$ is an ERAD maximum power limit;

$P_{series\_max\_hyst}$ is a hysteresis value for maximum driver demanded power in series drive;

$P_{series\_min}$ is $Max [(P_{battery\ charge\ limit} - P_{CISG\ maximum}), P_{ERAD\ minimum}]$;

$P_{battery\ charge\ limit}$ is a maximum charge power limit of battery;

$P_{CISG\ maximum}$ is a CISG maximum power limit;

$P_{ERAD\ minimum}$ is an ERAD minimum power limit;

$P_{series\_min\_hyst}$ is a hysteresis value for minimum driver demanded power in series drive;

$P_{eng}$ is power demanded from the engine; and $P_{eng\_threshold}$ is an engine power threshold for series driving.

18. A method for operating a vehicle powertrain, comprising:

using demanded engine power, demanded wheel power and battery power limits, to determine maximum and minimum series-drive power limits of powertrain electric machines and a battery that powers one of the machines;

operating the powertrain in series-drive if vehicle speed is less than a reference speed, demanded wheel power is between said limits, and demanded engine power is less than a reference engine power.

19. The method of claim 18, further comprising:

operating the powertrain in parallel-drive if vehicle speed is greater than the reference speed, demanded wheel power is between said limits, or demanded engine power exceeds a reference engine power.

* * * * *